(12) United States Patent
Onodi

(10) Patent No.: US 10,431,917 B2
(45) Date of Patent: Oct. 1, 2019

(54) CONNECTION DEVICE AND ELECTRICAL TUNNEL INSTALLATION

(71) Applicant: Woertz Engineering AG, Muttenz (CH)

(72) Inventor: Tamas Onodi, Thalwil (CH)

(73) Assignee: Woertz Engineering AG, Muttenz (CH)

( * ) Notice: Subject to any disclaimer, the term of this patent is extended or adjusted under 35 U.S.C. 154(b) by 0 days.

(21) Appl. No.: 16/125,858

(22) Filed: Sep. 10, 2018

(65) Prior Publication Data

US 2019/0081424 A1 Mar. 14, 2019

(30) Foreign Application Priority Data

Sep. 11, 2017 (EP) .................................... 17190315

(51) Int. Cl.
*H01R 12/81* (2011.01)
*H01R 13/527* (2006.01)
(Continued)

(52) U.S. Cl.
CPC .......... *H01R 12/81* (2013.01); *H01R 4/2406* (2018.01); *H01R 12/592* (2013.01);
(Continued)

(58) Field of Classification Search
CPC ........ H01R 13/5499; H01R 13/68–692; H01R 13/527; H01R 13/5205; H01R 13/5202;
(Continued)

(56) References Cited

U.S. PATENT DOCUMENTS 3,432,803 A * 3/1969 Nice ......................... H01J 5/44
439/611
4,559,973 A 12/1985 Hane et al.
(Continued)

FOREIGN PATENT DOCUMENTS

| DE | 2248276 A1 | 4/1973 |
|----|------------|--------|
| EP | 2568542 A1 | 3/2013 |
| EP | 2928025 A1 | 10/2015 |

OTHER PUBLICATIONS

DIN 410212.

(Continued)

*Primary Examiner* — Gary F Paumen
(74) *Attorney, Agent, or Firm* — Frost Brown Todd LLC

(57) ABSTRACT

A connection device for connecting a multicore branch line to a flat cable has a connection device housing that allows the flat cable to pass through, and penetration contacts for contacting the flat cable without stripping of the insulation. The penetration contacts are situated in the connection device housing. The connection device also has an electrical disconnection point between the branch line and the flat cable, and at least one seal in the area of at least one opening of the connection device housing for protection from penetration of dust and/or water. The connection device housing is made, at least partially, of plastic, and on its outer side or inner side is coated with a diffusion barrier layer, wherein the diffusion barrier layer includes one or more layers, one of which is a metallic layer.

10 Claims, 6 Drawing Sheets

(51) Int. Cl.
  *H02G 3/08* (2006.01)
  *H02G 9/08* (2006.01)
  *H01R 4/2406* (2018.01)
  *H01R 12/59* (2011.01)
  *H01R 12/61* (2011.01)
  *H01R 12/77* (2011.01)
  *H01R 13/52* (2006.01)
  *H01R 13/713* (2006.01)

(52) U.S. Cl.
  CPC ......... *H01R 12/613* (2013.01); *H01R 12/778* (2013.01); *H01R 13/5202* (2013.01); *H01R 13/5205* (2013.01); *H01R 13/527* (2013.01); *H01R 13/5216* (2013.01); *H01R 13/7137* (2013.01); *H02G 3/088* (2013.01); *H02G 9/08* (2013.01)

(58) Field of Classification Search
  CPC ............ H01R 13/5216; H01R 13/7137; H01R 12/81; H01R 12/592; H01R 12/613; H01R 12/778; H01R 4/2406; H01H 85/2035; H02G 3/088; H02G 9/08
  USPC .......... 439/620.26, 620.29–620.34, 931, 492
  See application file for complete search history.

(56) References Cited

U.S. PATENT DOCUMENTS

| | | | | |
|---|---|---|---|---|
| 4,695,259 A | * | 9/1987 | Uchida | H01R 33/9655 439/271 |
| 5,647,768 A | * | 7/1997 | Messuri | H01R 13/7195 439/620.09 |
| 5,938,450 A | * | 8/1999 | Nagafuji | H01R 13/6585 439/607.07 |
| 5,964,620 A | * | 10/1999 | Takahashi | H01R 9/0518 439/579 |
| 6,916,188 B2 | * | 7/2005 | Lang | H01R 13/514 439/101 |
| 9,773,585 B1 | * | 9/2017 | Rogers | H01B 7/295 |
| 2002/0081908 A1 | * | 6/2002 | Ahn | H01R 13/6467 439/676 |
| 2010/0144209 A1 | * | 6/2010 | Hetzer | H01R 4/2416 439/676 |
| 2010/0167581 A1 | * | 7/2010 | Hiner | H01R 4/4818 439/521 |
| 2015/0111436 A1 | * | 4/2015 | Zhang | H01R 13/405 439/676 |
| 2018/0006384 A1 | * | 1/2018 | Hayashi | H01R 4/2433 |

OTHER PUBLICATIONS

Eyerer et al., "Polymer Engineering Technologien und Praxis," Springer-Verlag, 2008 p. 111, catchword "Keramisierende Polymere."

Higgelke, Ralf: "EMV—und ESD-Beschichtungen: So halten Gehause dicht," Sep. 28, 2011; XP055458230.

Thompson et al., "In the Firing Line," European Coatings Journal, 2006, 12, pp. 34-39.

* cited by examiner

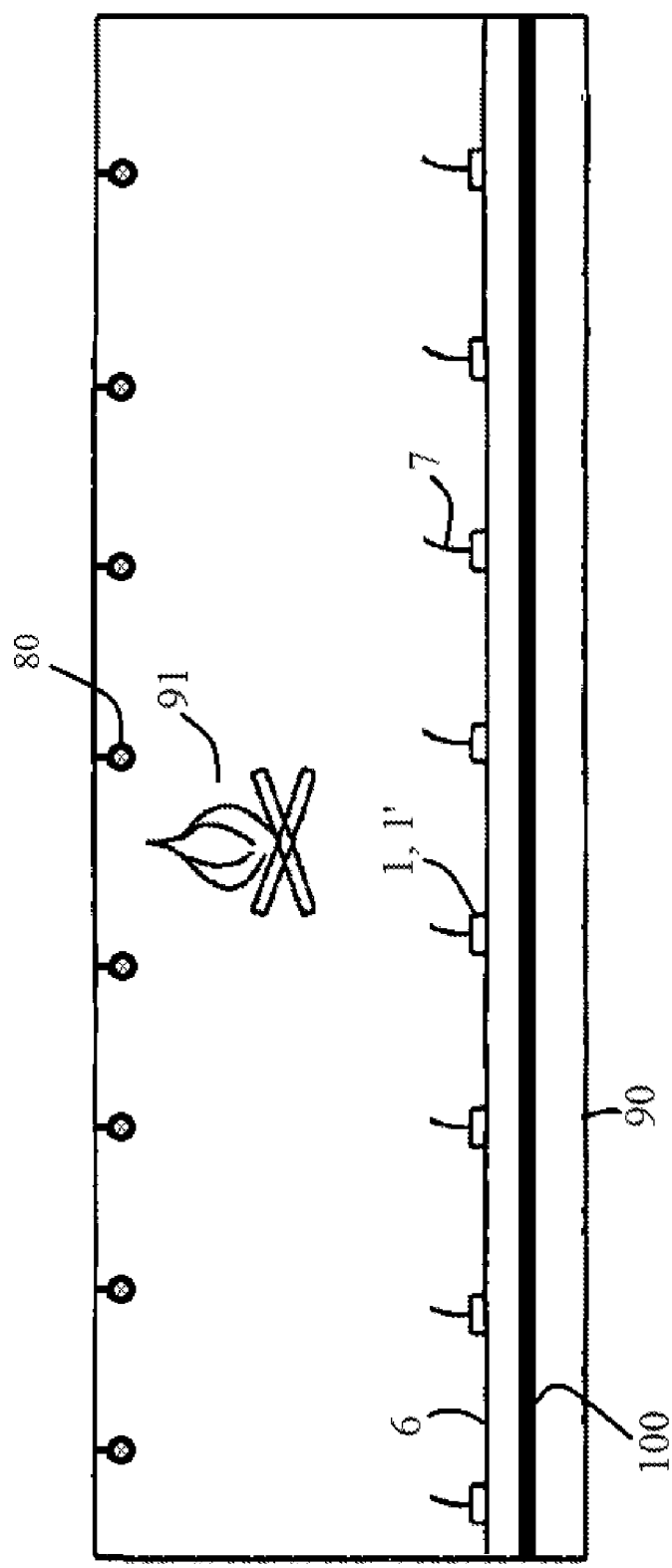

CONNECTION DEVICE AND ELECTRICAL TUNNEL INSTALLATION

FIELD OF THE INVENTION

The invention relates to a connection device and an electrical tunnel installation.

BACKGROUND OF THE INVENTION

In tunnels and buildings, safety installations are known in which a plurality of distributed electrical consumers, for example lights, are connected to a through line via branch lines. The through line is used for the joint supply of power to these consumers, which are typically situated at a distance from one another along the through line, and which are each connected to the through line via a separate branch line. A flat cable to which the branch line is connected to the flat cable, without stripping of the insulation, by means of a connection device with penetration contacts may be used as a through line. This type of installation is described in the publication EP 2 568 542 A1, for example.

In the event of a short circuit in a branch line, with such an electrical installation there should no functional impairment of consumers that are connected to other branch lines. For example, during a fire, after some time the insulation in the consumer or the branch line burns off and thus loses its insulation capability, resulting in a short circuit between the conductors, which then are no longer insulated from one another.

According to the DIN 410212 standard for functional integrity of electrical line systems, these systems must be designed in such a way that the safety-related installations and devices remain functional for a sufficient period of time in the event of fire. Retention of functionality is ensured according to the standard when the lines meet the test requirements for functional integrity class E90 or E30, i.e., remain functional for 90 or 30 minutes, respectively, when the lines on floor slabs are installed beneath the floor screed with a thickness of at least 30 mm, or are installed in the earth.

An electrochemical element is known from DE 2 248 276 A1, with a metal film that is applied to its outer surface in order to have additional protection from abrasion during handling.

BRIEF DESCRIPTION OF THE INVENTION

A connection device for connecting a multicore branch line to a flat cable represents a first aspect of the invention. The connection device includes a connection device housing that allows the flat cable to pass through, and penetration contacts for contacting the flat cable without stripping of the insulation. The penetration contacts are situated in the connection device housing. The connection device also includes an electrical disconnection point between the branch line and the flat cable. Furthermore, the connection device includes at least one seal in the area of at least one opening of the connection device housing for protection from penetration of dust and/or water. The connection device housing is made, at least partially, of plastic, and on its outer side or inner side is coated with a diffusion barrier layer. The diffusion barrier layer includes one or more layers, one of which is a metallic layer.

A second aspect relates to an electrical tunnel installation that includes a through line in the tunnel that is formed by at least one flat cable, at least one connection device according to the first aspect which is mounted on the flat cable, and branch lines that are connected to the connection device. The through line and the at least one connection device are situated in the lower portion of the tunnel cross section, in particular in the lower half, the lower third, or the lower fourth of the tunnel cross section.

GENERAL DESCRIPTION, ALSO WITH REGARD TO OPTIONAL EMBODIMENTS OF THE INVENTION

A first aspect of the invention relates to a connection device for connecting a multicore branch line to a flat cable.

The branch line is generally a (nonfireproof) round cable whose cores extend in the longitudinal direction of the cable, twisted in a customary manner. In this context, "core" refers to a core conductor together with its core insulation. Temperatures typical of a fire may damage the core insulation of the branch line, as the result of which one or more core conductors of the flat cable or of the branch line may possibly electrically contact one another, resulting in a short circuit. In addition, a defective consumer that is connected to the branch line may cause a short circuit. This consumer, even if it short-circuited the through line, would result in a loss of function of the through line. In this context, "loss of function" means that even consumers outside the fire area can no longer be supplied with electrical power via the through line. The present invention is intended to prevent such a loss of function, and in particular to ensure functional integrity in the event of fire, within the meaning of the above-referenced standards.

Flat cables are cables whose cores are situated in parallel to one another in a plane. The parallel arrangement of the cores makes a short circuit between the core conductors unlikely in comparison to round cables, even in the event of fire.

The connection device for connecting the branch line to the flat cable includes a connection device housing that allows the flat cable to pass through. The flat cable is guided through the housing of the connection device at a desired connection point, and enters at one end of the connection device housing and exits at the other end.

Situated within this housing are penetration contacts that contact the flat cable without stripping of the insulation. Upon contacting without stripping of the insulation, the insulation layer, which encloses a core of the flat cable, is not removed when electrical contact is established with the core conductor. Rather, the insulating cover of the flat cable and the core insulation of a core are punctured by means of electrically conductive penetration contacts, and the electrical connection of the connection device with the particular core is established by contact of the at least one electrically conductive penetration contact with the core conductor of the flat cable to be contacted. Examples of possible penetration contacts are contact screws that centrally contact at least one flat cable core, or contact screws, having a cutting thread, that laterally contact at least one flat cable core.

However, upon contacting of the flat cable by means of the penetration contacts, the puncturing of the cable sheathing and the core insulation creates an open position on the cable, which otherwise has a watertight design that is usually provided by plastic sheathing. Water may reach the flat cable cores at this tapping point, and may trigger breakdowns or short circuits. In addition, electrical conductive elements without their own insulation, exposed metallic terminals, or exposed metallic fuse contacts may be present within the connection device. Thus, as a whole the tapping point of the flat cable within the branch socket is an electrical "weak point" which in particular must be protected from penetration of water or dust.

The connection device includes an electrical disconnection point between the branch line and the flat cable. The electrical disconnection point separates, for example, the electrical connection between each core of the flat cable and each core of the round cable. Interruption elements, such as fuses, for each contacted core of the flat cable may be provided for this purpose. The interruption elements may be provided only for each live core (phase conductor) of the flat cable, or for all cores of the flat cable (also including possible neutral conductors or protective conductors). Cylindrical festoon fuses, bimetal fuses, and the like represent possible variants for fuses as interruption elements of the disconnection point. Although the electrical disconnection point is part of the connection device, it may be situated inside or outside the connection device housing. In any case, the disconnection point is electrically situated between the branch line and the flat cable, and thus makes a separation downstream from the penetration contacts but upstream from a connection point for the branch line.

The connection device includes at least one seal in the area of at least one opening of the connection device housing for protection from penetration of dust and/or water. The connection device has openings that allow the flat cable to pass through. Each of these openings is protected from penetration of dust and water by an associated seal, for example. The connection device housing may be openable for the replacement of fuses. Such an opening that is used for replacement of at least one fuse is also protected by an associated seal. The seal(s) is/are intended to ensure protection from penetration of dust and water, corresponding to the IP 20 standard.

The at least one seal is, for example, an O-ring type of seal made, for example, of various types of rubber, perfluoro rubber (FFKM or FFPM), polyethylene (PE), polytetrafluoroethylene (PTFE), or molded silicone. The at least one seal may also be a metallized seal or a labyrinth seal. Seals having different designs may be provided for various openings of the connection device housing.

The connection device housing is made, at least partially, of plastic. The connection device housing may thus be made completely of plastic but may have elements that are not made of plastic. Plastics are good electrical insulators, and provide good thermal insulation; i.e., they do not conduct heat well into the interior of the connection device.

In addition, a plastic housing does not have to be grounded separately, and is relatively inexpensive. Examples of plastics that are suitable as material for the connection device housing include plastics from the group comprising polyoefins, such as polyethylene (PE), polypropylene (PP), polymethylpentene (PMP), polyisobutylene (PM), or polybutylene (PB). For example, plastics are selected which do not outgas toxic vapors, even under the heat effect that is typical in the event of fire.

In addition, many plastics are virtually, if not completely, diffusion-tight. Plastics generally absorb water, but not in large enough quantities that would result in loss of their electrical insulation capability. However, small quantities of water that have penetrated into plastics, together with materials that have dissolved out of the plastic, may create leakage currents.

To prevent this, the connection device housing is coated with a diffusion barrier layer on its outer side or inner side. The diffusion barrier layer includes one or more layers, one of which is a metallic layer. The diffusion barrier layer is used to prevent diffusion of water or other liquids into the plastic of the connection device housing or of the overall connection device.

For this purpose, a metal atom layer consisting of several hundred layers of metal atoms, for example, is sufficient. The layer thickness of such an atom layer is from a few nanometers to several hundred nanometers, for example. Such a coating may be produced, for example, by vapor deposition onto the outer side or inner side of the connection device housing. It is also possible to produce the metallic layer by sputter deposition, plasma-assisted chemical layer deposition, or the like onto the outer side or inner side of the connection device housing. Aluminum or copper, for example, are suitable as coating metals.

The diffusion barrier layer made of metal is applied to the outer surface or inner surface of the connection device housing.

The diffusion barrier layer extends over the entire outer surface or inner surface of the connection device housing.

In some embodiments, the connection device includes a branch line socket for the branch line to exit from the connection device. The branch line socket is mounted on the connection device. In some embodiments, the exterior branch line socket opens, for example, into a borehole in the housing of the connection device, where it accommodates, for example, electrical conductive elements that are electrically connected to the penetration contacts. The branch line is connected to the branch line socket, and via the branch line socket is connected to the electrical conductive elements in question.

In such embodiments, the branch line socket includes a branch line socket housing that is made, at least partially, of plastic. The electrical disconnection point between the flat cable and the branch line within the connection device may instead be situated within the connection device housing, for example also within the branch line socket.

In embodiments with a branch line socket housing, the branch line socket housing is also coated on its outer side or inner side with a diffusion barrier layer. The diffusion barrier layer includes one or more layers, one of which is a metallic layer.

All descriptions with regard to the diffusion barrier layer of the connection device housing likewise apply to the branch line socket housing. Both housings are, for example, made completely of plastic, and by treatment using the same method are coated with a metallic layer that is part of the diffusion barrier layer.

In some embodiments, the metallic layer of the diffusion barrier layer is produced by vapor deposition of a metal film onto the housing of the connection device and/or the branch line socket housing.

During the vapor deposition, the desired coating materials (in the present case metals, for example aluminum or copper) are heated so that they evaporate, or, depending on the metal, sublime. The coating material is then led to a substrate (in the present case, the outer side or inner side of the housing of the connection device, or, in some embodiments, of the branch line socket housing) and condenses there, thus forming the coating.

The layer thickness in the vapor deposition is typically a few nanometers to several hundred nanometers. Such a thin layer is already thick enough to prevent diffusion of water toward the outer side or inner side of the housing or housings. By the selection of vapor deposition as the coating method, only the amount of metallic coating material that is necessary to achieve the objective is consumed. In addition, vapor deposition is less complicated than other coating methods such as sputtering, galvanic deposition, or plasma-assisted chemical layer deposition.

In some embodiments, the metallic layer is produced by vapor deposition of an aluminum layer.

Aluminum is impermeable not only to liquids, for example, but also to vapor, which thus also prevents atmospheric moisture from depositing on the outer side or inner side of the connection device housing or branch line socket housing. Aluminum also provides effective corrosion protection, since it oxidizes relatively easily upon (possibly inadvertent) contact with air, and the resulting oxide layer renews itself when it is penetrated.

The aluminum layer effectively protects the outer side or inner side of the connection device housing or of the branch line socket housing from diffusion of liquids and from corrosion.

In some embodiments, the diffusion barrier layer includes a protective layer that is applied to the metallic layer. In some embodiments, the protective layer is a hard lacquer layer.

The purpose of the protective layer made of hard lacquer, for example, is to make the diffusion barrier layer even less susceptible to corrosion and to protect it from scratches. Oxidation of the metallic layer by atmospheric oxygen may likewise be prevented by the protective layer that is applied to the metallic layer.

In some embodiments, the connection device housing and/or the branch line socket housing are/is made of a plastic that includes polyethylene.

Polyethylene is a very good electrical insulator, and in the presence of electric fields has a slight polarization, and thus, low dielectric losses (the dielectric loss factor for polyethylene is approximately $10^{-4}$).

When the connection device housing or the branch line socket housing is made completely or virtually completely of polyethylene, it is ensured that the polyethylene is processed in such a way that no water inclusions can develop in the housing in the event that the diffusion barrier layer is damaged. Otherwise, such water inclusions may result in a so-called "water tree." The electric field strength here is focused by water that is trapped in finely branched channels through the plastic, due to the fact that the dielectric constant, and correspondingly, the polarization of water, is very high compared to plastics such as polyethylene, which may result in microdischarges.

For example, polyethylene of the high-density polyethylene (PE-HD) type is used to manufacture the connection device housing or the branch line socket housing.

In some embodiments, the at least one seal is made, at least in part, from molded silicone to achieve complete diffusion-tightness in the area of openings of the connection device housing and/or of the branch line socket housing.

In some embodiments, the at least one seal is made, at least in part, from a metallized layer to achieve complete diffusion-tightness in the area of openings of the connection device housing and/or of the branch line socket housing.

A metallized seal is made, for example, of a soft material such as rubber which provides the flexibility necessary for sealing, and whose surface is metallized for the necessary strength.

The metallized seal(s) made of molded silicone is/are selected, for example, in such a way that the seals fit tightly against openings of the connection device housing or of the branch socket housing.

In some embodiments, the at least one seal is a labyrinth seal, in which incomplete diffusion-tightness in the area of the labyrinth seal is tolerated.

In principle, labyrinth seals are based on an extension of the flow path through the opening to be sealed off. Strictly speaking, such seals are not completely tight, and are thus used when there is tolerance for diffusion occurring in the area of the seal. This is the case, for example, when no electrically conductive parts, but instead ceramic parts, for example, are present anyway in the area of the opening of the connection device housing or branch line socket housing which are to be largely sealed off.

In some embodiments, the electrical disconnection point is formed by at least one fuse, the fuse being triggerable by surrounding temperatures typical for fire, and/or by overcurrent.

A thermally triggerable fuse, for example, separates the electrical connection between the section of the branch line on one side and on the other side when the surrounding temperature at the site of the fuse inset exceeds a value that is typical for fire. A "surrounding temperature typical for fire" is a temperature that is normally reached only in the event of a fire.

A fuse that is triggerable by overcurrent separates the electrical connection between the flat cable and the branch line, for example when an overcurrent that is typical of a short circuit is present at the fuse. In some embodiments, the branch line is safeguarded against both overcurrent and excessive temperature. Thus, for example, two fuses for each safeguarded core are connected in series.

In some embodiments, electrically conductive parts within the connection device are kept electrically insulated from one another by fire-resistant, electrically insulating parts, even in the event of fire. Electrically conductive parts within the connection device are, for example, metal parts that connect the penetration contacts to metallic connection points of the branch line. These metal parts are embedded, for example, in molded bodies made of ceramic. In this context, "ceramic" generally means inorganic, nonmetallic, polycrystalline materials that undergo a sintering process during burning. Materials such as glass ceramic and composite ceramic also fall under the term "ceramic."

A second aspect relates to an electrical tunnel installation that is intended to ensure functional integrity in the event of fire, i.e., a short circuit-free connection of the cables in the event of fire.

The electrical tunnel installation includes a through line, formed by at least one flat cable, in the tunnel, at least one connection device according to the possible embodiments described above that is mounted on the flat cable, and branch lines that are connected to the connection device.

The through line, from an electrical standpoint, represents a continuous line which in some embodiments has a length that, possibly except for the lengths of branch lines situated in end areas, essentially corresponds to the total length of the electrical installation. If the through line is formed by a flat cable, the length of the through line corresponds, for example, to the length of the flat cable.

The flat cable has, for example, an outer sheathing made of silicone rubber which protects the core conductors from contact with dust or water. The at least one through line is guided, for example, through at least one cable duct along a tunnel.

The through line and the at least one connection device are situated in the lower portion of the tunnel cross section, in particular in the lower half, the lower third, or the lower fourth of the tunnel cross section.

The flat cable at this level is guided, for example, on a cable tray as a cable duct that extends along the tunnel wall in the longitudinal direction. The cable tray may also accommodate the connection devices.

In principle, the temperatures that prevail during a fire in a facility such as a tunnel are lower with decreasing height, since the air that is heated by the fire rises in the direction of the tunnel ceiling; thus, in the event of a fire, a temperature gradient prevails which makes it favorable, with regard to the temperature aspect, to install a through line or connection devices as deeply as possible with respect to their electrical contacting within the tunnel cross section.

However, in principle a moisture gradient of the surroundings also occurs in tunnels. The moisture level increases with increasing proximity to the floor or with increasing depth in the floor. This is caused by rainwater that penetrates into such a tunnel and collects in the vicinity of the floor, by seepage water that accumulates in deeper layers of the earth, or by spray water, for example from sprinkler systems, which likewise drains off toward the floor.

To prevent diffusion of liquids through the plastic layer to the greatest extent possible, and thus in particular to protect the tapping point of the flat cable (the location at which the above-mentioned penetration contacts puncture the cable sheathing or the cable insulation), branches are provided, taking into account this weak point, from the through line at the greatest possible height in a tunnel, i.e., preferably in the upper half, or in the upper fourth of the tunnel cross section, or in the direct proximity of the tunnel ceiling, since this is favorable with regard to the moisture aspect.

However, the more deeply through lines or connection devices are laid with respect to their electrical contacting, the more likely it is that water will contact these elements of the electrical installation, which for a conventional through line/connection device would be sufficient to cause at least leakage currents within the connection device housing, or even a short circuit in the vicinity of the tapping point.

To make it possible at all to install the through line, designed as a flat cable, or the connection devices with respect to their electrical contacting within the tunnel, taking into account the moisture aspect, within the lower half of the tunnel cross section, in particular the lower third or the lower fourth of the tunnel cross section, i.e., at a depth at which the through line and the connection device are exposed to temperatures that are lower than temperatures in the upper half of the tunnel, the through line and connection devices with respect to their electrical contacting must be protected via additional measures against the penetration of water.

This protection is ensured by one embodiment of the connection device as described in conjunction with the first aspect, relating to the connection device, and in conjunction with the design of the flat cable. The selection of a connection device housing made of plastic, whose outer side or inner side is coated with the diffusion barrier layer described above, is crucial for the (water)-tightness and protection against short circuits of the connection device in the event of fire. The metallic layer of the diffusion barrier layer serves as the primary barrier against diffusion.

Since short circuits may occur, for example, in a consumer or a branch line for a through line or a connection device with respect to its electrical contacting that is laid more deeply in tunnels compared to conventional electrical installations, an electrical disconnection point within the connection device is provided which is implemented, for example, by one or more fuses that respond at excessive temperature or overcurrent.

In some embodiments, the flat cable includes at least two core conductors, a fireproof core insulation layer, and an outer sheathing, wherein the core insulation layer contains insulation material that ceramifies in the event of fire, the core insulation layer is extruded directly onto at least one core conductor of the flat cable, and the outer sheathing includes silicone rubber. In addition, the core conductor enveloped by the ceramifying core insulation layer may be embedded in intermediate sheathing made of plastic, which in turn is enclosed by the outer sheathing. The intermediate sheathing imparts rigidity to the flat cable, and due to its elastic properties provides enough pressure force, even in the event of fire, to keep the core conductors spaced apart from one another.

The fireproof core insulation layer has an annular shape, for example. For the live core(s) and optionally also for the neutral conductor and/or the protective conductor, i.e., at least for one core of the flat cable, the core insulation contains insulation material that ceramifies in the event of fire, and that is extruded directly, i.e., without an additional intermediate layer, onto the conductor surface.

Insulation materials that ceramify in the event of fire are known in the prior art, for example from P. Eyerer et al., Polymer Engineering Technologien and Praxis [Polymer Engineering Technologies and Practice], Springer-Verlag, 2008, p. 111, keyword "ceramifying polymers," and K. W. Thomson et al., "In the firing line," European Coatings Journal, 2006, 12, pp. 34-39. The insulation material is, for example, a thermoplastic plastic having one or more additives that ceramify in the event of fire, and that form a ceramic crust when the plastic burns off. The additives may be, for example, silicate material, metal oxides or semimetal oxides (such as $SiO_2$, $Al_2O_3$), or other suitable ceramifying materials such as zinc borate, or mixtures thereof. The ceramifying plastic is applied as a melt, for example, directly to the surface of the core conductor, and annularly encloses the core conductors in cross section. When the plastic of the core insulation burns off in the event of fire, the ceramifying additive forms the stated insulating crust, which then ensures a certain degree of electrical insulation.

If, in spite of deeper installation, a fire spreads to the flat cable or the connection device, or the temperature nevertheless exceeds a predefined value, ceramic parts are provided in the connection device, for example, as mentioned above, which keep the electrically conductive parts insulated from one another, while the core conductors of the flat cable are coated with a core insulation layer that ceramifies in the event of fire.

BRIEF DESCRIPTION OF THE DRAWINGS

The appended drawings illustrate exemplary embodiments of the various aspects of the invention. The drawings show the following:

FIG. 6 shows a schematic illustration of an electrical installation in the event of fire.

DESCRIPTION OF EXEMPLARY EMBODIMENTS WITH REFERENCE TO THE DRAWINGS

Figure 1:
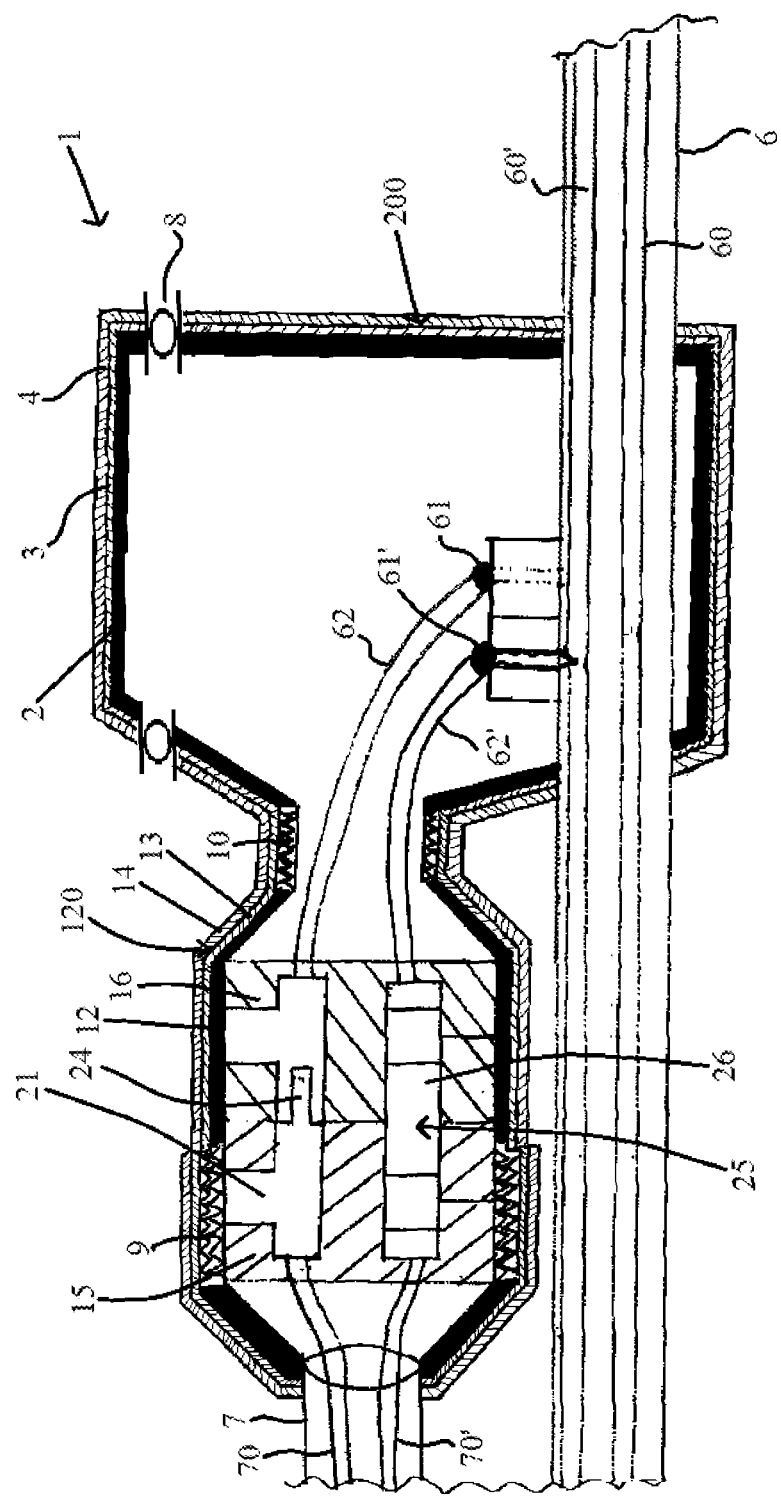
FIG. 1 shows a detailed, schematic side sectional illustration of a connection device with two housings, each having an associated diffusion barrier layer.

The connection device 1 according to FIG. 1 contacts cores of a flat cable 60, 60', and establishes an electrical connection between the cores of the flat cable 60, 60', which are part of the flat cable 6, and the cores of the branch line 70, 70', which are part of the branch line 7. The cores of the flat cable 60, 60', using the example here of a single phase conductor core 60' and a neutral conductor core 60, are contacted by penetration contacts 61, 61' without stripping of the insulation. The penetration contacts 61, 61' are situated in the connection device housing 2. The flat cable 6 is guided through the connection device housing 2.

A penetration contact 61', which is associated with a phase conductor core 60', is electrically connected to a fuse inset 26 via a connection core 62' of the connecting line. The fuse inset 26 represents an electrical disconnection point between the flat cable 6 and the branch line 7, with respect to the phase conductor core 60.

A penetration contact 61 that contacts a neutral conductor core 60 is connected to a neutral conductor contact bridge 21 via a connection core 62. A plug-in contact 24 forms a mechanical and electrical disconnection point 25 in the neutral conductor contact bridge 21. The fuse inset 26 and the neutral conductor contact bridge 21 are situated in the area of a dividing surface of two ceramic partial insulation bodies 15 and 16.

The at least one phase-conducting core of the branch line 70' is connected to the fuse inset 26 on the other side of the electrical disconnection point 25. If multiple phase-conducting cores 60 are contacted, they are electrically separable from the branch line 7 by corresponding multiple fuse insets 26. The fuse inset 26 or the fuse insets 26 separate(s) in the event of overcurrent or at temperatures typical for fire. A neutral-conducting core of the branch line 70 is connected to the neutral conductor contact bridge 21.

In the exemplary embodiment of a diffusion barrier layer of the connection device housing 200 shown in FIG. 1, the connection device housing 2 is enclosed on its outer side. The diffusion barrier layer of the connection device housing 200 may likewise enclose the inner side of the connection device housing 200 (not illustrated in the figures). The diffusion barrier layer of the connection device housing 200 protects the connection device 1 from penetration of water and dust in the area of the connection device housing 2, and thus prevents short circuits in the area of the penetration contacts 61, 61', for example. The diffusion barrier layer of the connection device housing 200 is made of a vapor-deposited aluminum layer 3 and a hard lacquer layer 4, the hard lacquer layer 4 being applied to the aluminum layer 3. The vapor-deposited aluminum layer 3 is used here as an actual diffusion barrier; water molecules, whether they are in gaseous form (vapor) or liquid form (fire-extinguishing water, spray water, seepage water, or natural tunnel moisture), cannot diffuse through this layer. The hard lacquer layer 4 is applied to this vapor-deposited aluminum layer, which is only a few hundred atom layers thick, to protect it from scratches, mechanical damage, or erosion.

The thickness of the vapor-deposited aluminum layer 3 and of the hard lacquer layer 4 is not illustrated true to scale in FIG. 1, since the vapor-deposited aluminum layer 3 is only a few hundred atom layers thick, for example. Rather, the illustration in FIG. 1 is used to emphasize the two (partial) layers of the diffusion barrier layer.

In addition, the connection device housing 2 is equipped with a seal 8, for example a silicone rubber seal or a labyrinth seal, in the area of the cover of the connection device housing. Such a seal may, for example, also be provided in the area of the openings of the connection device housing that are used to accommodate the flat cable 6.

A branch line socket that includes a branch line socket housing 12 is screwed onto the connection device housing 2 via a screw thread 10. The branch line socket housing 12 is made of plastic, for example likewise polyethylene, and forms the shell for the partial insulation bodies 15, 16 into which the neutral conductor contact bridge 21 and the fuse inset 26 are inserted. The fuse inset 26 may be designed in such a way that it responds either to overcurrent, or to temperatures that are typical for fire.

In the exemplary embodiment of a diffusion barrier layer, namely, the diffusion barrier layer of the branch line socket housing 120, shown in FIG. 1, the branch line socket housing 12 is also enclosed on its outer side. Alternatively, the diffusion barrier layer of the branch line socket housing 120 may enclose the inner side of the branch line socket housing 12. The diffusion barrier layer of the branch line socket housing 120 has the same design as the diffusion barrier layer of the connection device housing, namely, is made of a vapor-deposited aluminum layer 13 and a hard lacquer layer 14.

The branch line socket housing 12 may be opened and closed via a closure cap having a screw-on top 9 (for example, to allow replacement of the fuse inset 26 without having to open the connection device housing 2). This cap is part of the branch line socket housing 12, and therefore is correspondingly coated with the same diffusion barrier layer 120. The diffusion barrier layer of the branch line socket housing protects the connection device 1 from penetration of water/dust in the area of the neutral conductor contact bridge 21 and the fuse inset 26.

Figure 2:
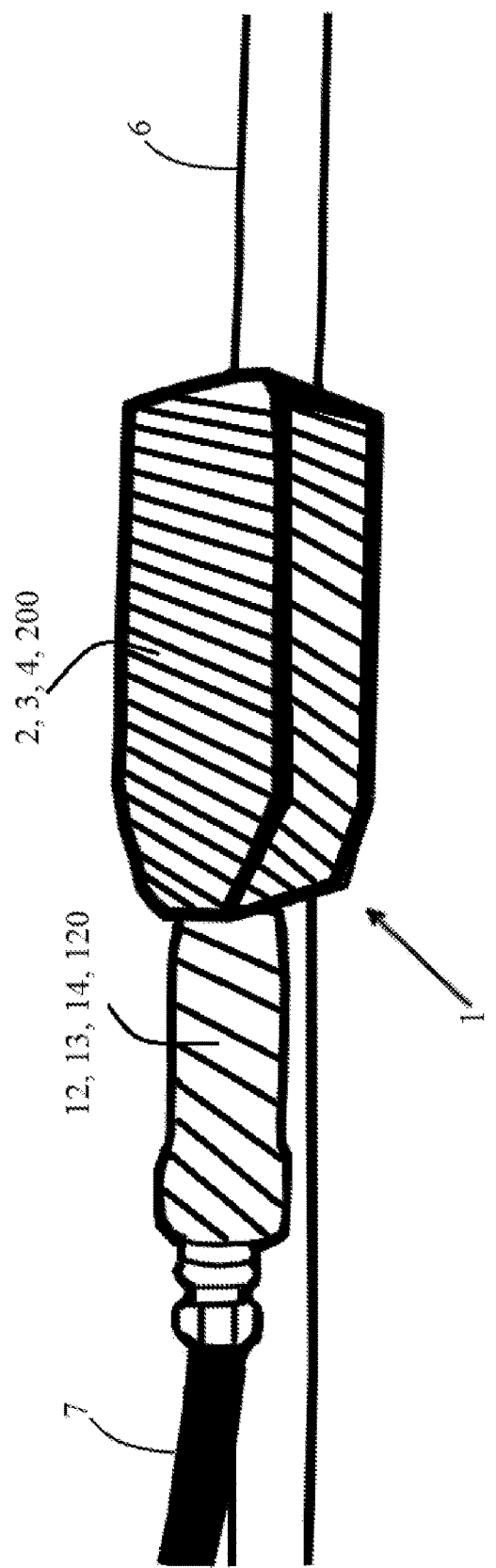
FIG. 2 shows a schematic top view of a connection device according to FIG. 1.

FIG. 2 illustrates a schematic external view of the connection device 1 which connects the through line, designed as a flat cable 6, to the branch line 7. The connection device housing 2 is made of polyethylene, and is not visible in this external view. Rather, only the outermost layer of the diffusion barrier layer of the connection device housing 200 is visible, namely, the hard lacquer layer 4. The same applies for the branch line socket housing 12, for which only the hard lacquer layer 14 of the diffusion barrier layer of the branch line socket housing 120 is visible.

Figure 3:
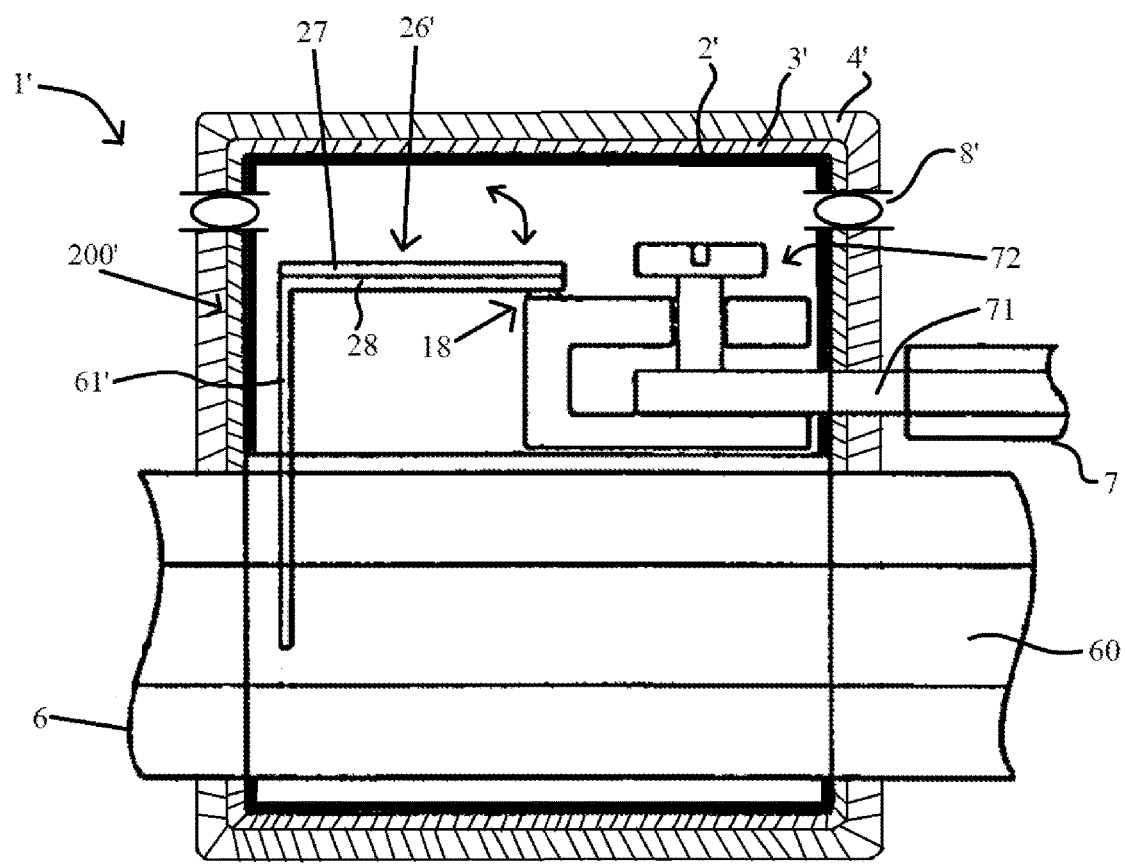
FIG. 3 shows a detailed, schematic side sectional illustration of a connection device with a housing having a diffusion barrier layer.

FIG. 3 represents one alternative embodiment of a connection device 1', namely, a connection device without a branch line socket, and with an electrical disconnection point 18 directly in the connection device housing 2'.

A core 60 of a flat cable 6 that is guided through the connection device housing 2' is contacted by means of a penetration contact, in the present case a contact blade 61, without stripping of the insulation. The contact blade is connected directly to a bimetal fuse inset 26' that includes bimetal elements 27, 28. This fuse inset 26' separates the electrical connection between the flat cable 6 and the branch line 7 when the bimetal elements 27, 28 bend away from an electrical contact point, having the screw terminal 72, at temperatures typical for fire, for example 150° C. The screw terminal 72 in turn clamps a litz wire 71 of the branch line 7 inside the connection device housing, and establishes contact with the conductive bimetal elements 27, 28 of the bimetal fuse inset 26'.

The connection device housing 2' made of plastic (polyethylene), the same as in the preceding embodiment, is enclosed on its outer side by a diffusion barrier layer 200'. Alternatively, the diffusion barrier layer 200' may enclose the connection device housing 2' on its inner side (not illustrated in FIG. 3). The diffusion barrier layer 200' includes a first aluminum layer 3' that is vapor-deposited directly onto the connection device housing 2', and a surrounding hard lacquer layer 4' that protects this aluminum layer. In turn, a seal 8, for example made of silicone rubber or a labyrinth seal, is situated in the area of an opening of the connection device housing 2' and is used for replacement of the fuse or the contact blade 61'. In addition, seals 8 may also be inserted into the openings for guiding the flat cable through.

Figure 4:
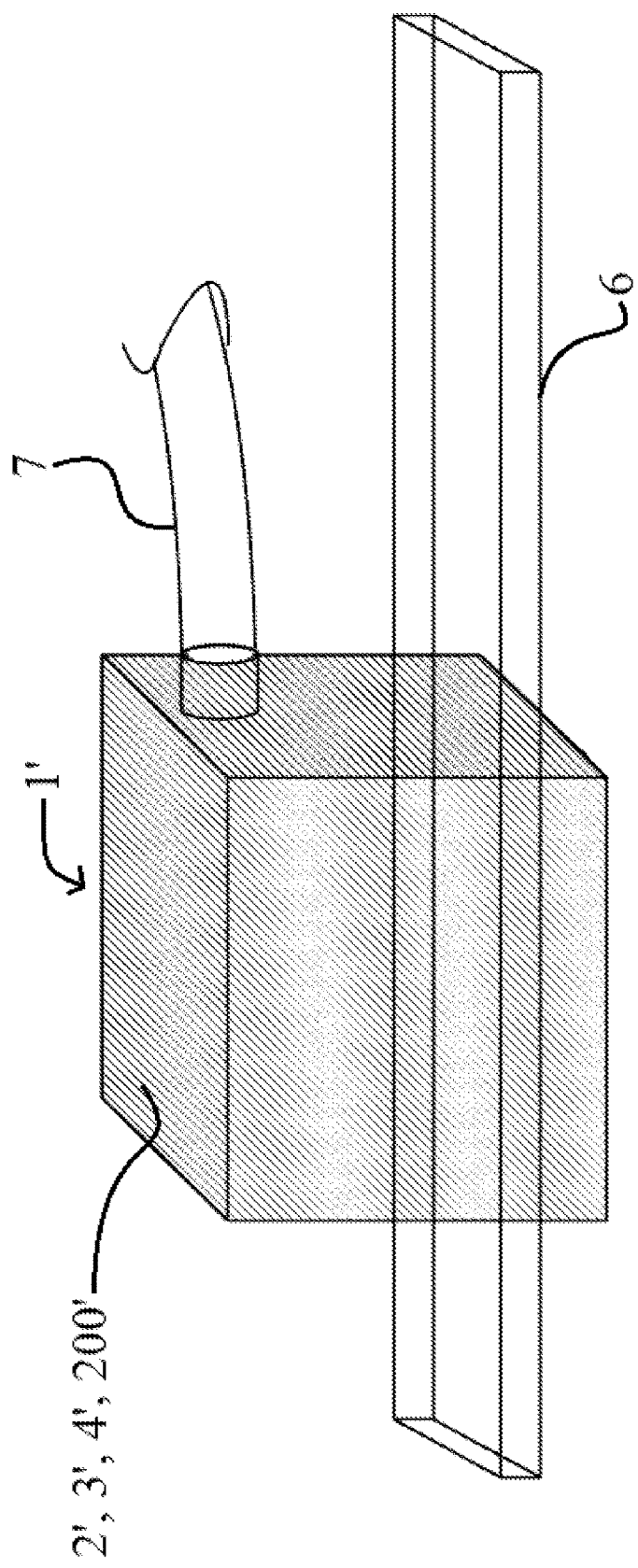
FIG. 4 shows a schematic top view of a connection device according to FIG. 3, FIGS. 5*a* through 5*c* show schematic sectional illustrations of various electrical tunnel installations.

FIG. 4 illustrates a schematic external view of the connection device 1' which connects the through line, designed as a flat cable 6, to the branch line 7. The connection device housing made of polyethylene 2' is also not visible in this external view. Rather, only the outermost layer of the diffusion barrier layer of the connection device housing 200', namely, the hard lacquer layer 4', is visible.

Figure 5C:
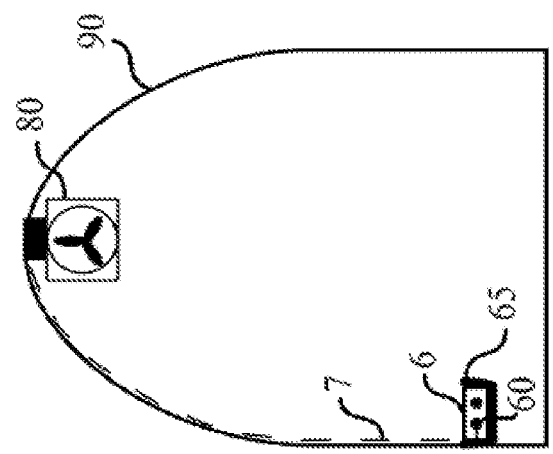
Figure 5B:
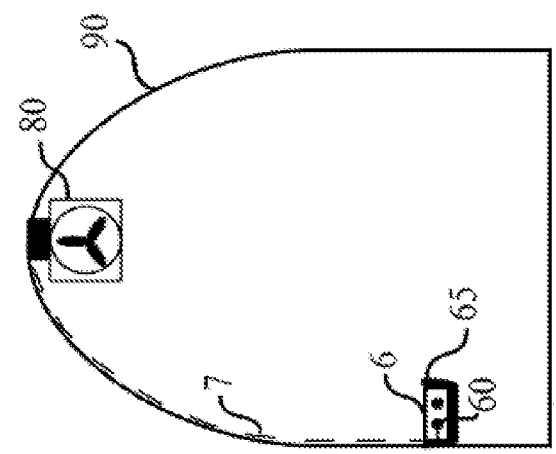
Figure 5A:
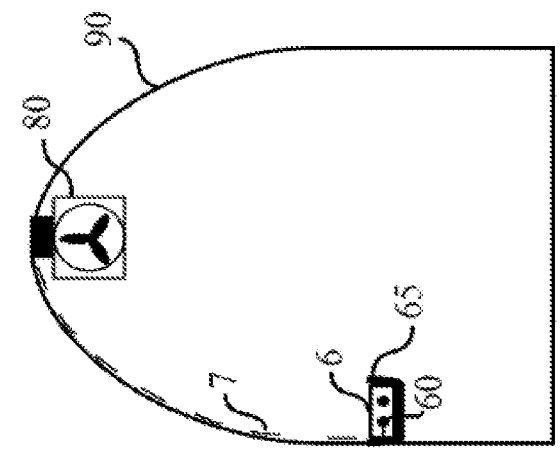

FIGS. 5a, 5b, 5c show various schematic sectional illustrations of examples of electrical tunnel installations. The electrical tunnel installations illustrated in FIGS. 5a, 5b, 5c include a through line which is designed as a flat cable 6, and whose at least two cable cores 60 are connected to at least one branch line 7 by connection devices 1, 1' (not illustrated in FIGS. 5a, 5b, 5c). One or more branch lines 7 feed consumers 80 in the tunnel 90, which are illustrated here as tunnel ventilators by way of example.

In the electrical tunnel installation illustrated in FIG. 5a, the flat cable 6 is laid along the side of the tunnel 90 on a cable tray 65. The cable tray 65 is fastened to the tunnel wall. The cable tray 65 is arranged within the lower portion of the tunnel cross section, in the present case in the lower half of the tunnel cross section. The branching via a connection device 1, 1' takes place within the cable tray, as the result of which the "weak point" of the installation, namely, the tapping point, is also situated within the cable tray.

In the electrical tunnel installation schematically illustrated in FIG. 5b, the flat cable 6 via a cable tray 65 is situated in the lower third of the tunnel cross section, and the tapping through a connection device 1, 1' within the cable tray 65 likewise takes place at this level.

Lastly, the tunnel installation schematically illustrated in FIG. 5c corresponds to those illustrated in FIG. 5a and FIG. 5b, except that the flat cable 6 via the cable tray 65 is situated in the lower fourth of the tunnel cross section, as the result of which the tapping point through the connection device 1, 1' is likewise situated at this level.

Although the temperatures in the event of fire at the installation heights for the flat cable 90 and the connection devices 1, 1' likewise situated in the cable tray 65, in the tunnel, illustrated in FIGS. 5a through 5c, are advantageous since they are lower than in an upper portion of the tunnel cross section (for example, the upper third or upper fourth of the tunnel cross section), at this height there is an increased risk that, for example, rainwater flowing into the tunnel may reach a connection device 1, 1' situated in the cable tray.

However, to prevent a loss of insulation or a water short circuit due to contact of water with, for example, electrically conductive parts of the flat cable or of the connection device 1, 1', the flat cable has sheathing made of silicone rubber that is impermeable to water, and the connection devices 1, 1' are equipped with the diffusion barrier layer previously described in conjunction with the connection device 1, 1'. In the event that a short circuit occurs at a consumer 80, which could propagate in the flat cable, or, for example at temperatures typical for severe fires, could also reach the vicinity of the cable tray 65, the connection devices 1, 1' are provided with at least one fuse inset 26 26' as described above, which separates the connection between the flat cable 6 and the branch line 7, either at temperatures typical for fire or in the event of overcurrent.

FIG. 6 illustrates a fire as an example of the effect of a fire on an electrical installation. In the event of a fire, the fire area 91 usually extends over only a certain partial length of the tunnel 90. FIG. 6 shows by way of example a fire area 91 that is delimited along the tunnel 90, in which only two consumers 80 are affected by harmful fire and heat effects. The fire area 91 is an area of the tunnel 1 in which temperatures of at least 150° C., for example, prevail.

To ensure functional integrity of the electrical installation, on the one hand the connection devices 1, 1' are equipped with one or more fuse insets 18 that trigger due to overcurrent and/or heat. The portion of the connection device 6 situated on this side of this safeguard may optionally have a fire-resistant design, and therefore the branch lines 7 may be made of nonfire-resistant material.

The flat cable 6 and the connection devices 1, 1' are situated, for example, in a cable tray (not illustrated) at 10 to 20 percent of the overall tunnel height, so that a temperature typical for fire does not prevail in this area. As a result, occurrence of a short circuit due to fire effects may be prevented, not at the consumer 80, but, rather, at the connection devices 1, 1' or the flat cable 6 itself.

On the other hand, at such a height, as described above, the risk of a short circuit or a malfunction resulting from loss of insulation due to water is greater than if the flat cable 6 and connection devices 1, 1' were situated above this level. To prevent this, the flat cable 6, as described above, is equipped with sheathing made of silicone rubber, and the connection device housings 2, 2' on their outer side or inner side are coated with the diffusion barrier layer described above.

The invention claimed is:

1. A connection device for connecting a multicore branch line to a flat cable, comprising:
   a connection device housing that allows the flat cable to pass through;
   penetration contacts for contacting the flat cable without stripping of the insulation, the penetration contacts being situated in the connection device housing;
   an electrical disconnection point between the branch line and the flat cable;
   at least one seal in an area of at least one opening of the connection device housing for protection from penetration of dust and/or water,
   wherein the connection device housing is made, at least partially, of plastic that includes polyethylene, and
   wherein the connection device housing on an outer side or an inner side is coated with a diffusion barrier layer, and
   wherein the diffusion barrier layer includes one or more layers, one of which is a metallic layer, wherein the metallic layer of the diffusion barrier layer comprises a vapor deposition of an aluminum film onto the outer side or the inner side of the housing of the connection device, wherein the layer thickness of the vapor deposition is a few nanometers to several hundred nanometers, and wherein the vapor deposition of the aluminum film is configured to prevent diffusion of vapor or liquid water molecules through the connection device housing.

2. The connection device according to claim 1, wherein the connection device includes a branch line socket for the branch line to exit from the connection device, wherein the branch line socket includes a branch line socket housing, wherein the branch line socket is mounted on the connection device, wherein the branch line socket housing is made, at least partially, of plastic and on its outer side or inner side is coated with a diffusion barrier layer, wherein the diffusion barrier layer includes one or more layers, one of which is a metallic layer.

3. The connection device according to claim 1, wherein the diffusion barrier layer includes a protective layer that is applied to the metallic layer.

4. The connection device according to claim 3, wherein the protective layer is a hard lacquer layer.

5. The connection device according to claim 2, wherein the at least one seal is made, at least in part, from molded silicone to achieve complete diffusion-tightness in the area of openings of the connection device housing and/or of the branch line socket housing.

6. The connection device according to claim 2, wherein the at least one seal is made, at least in part, from a metallized layer to achieve complete diffusion-tightness in the area of openings of the connection device housing and/or of the branch line socket housing.

7. The connection device according to claim 1, wherein the at least one seal is a labyrinth seal, in which incomplete diffusion-tightness in the area of the labyrinth seal is tolerated.

8. The connection device according to claim 1, wherein the electrical disconnection point is formed by at least one fuse, the fuse being triggerable by surrounding temperatures typical for fire, and/or by overcurrent.

9. The connection device according to claim 1, wherein electrically conductive parts within the connection device are kept electrically insulated from one another by fire-resistant, electrically insulating parts, even in the event of fire.

10. An electrical tunnel installation, comprising:
a through line in the tunnel that is formed by at least one flat cable;
at least one connection device according to claim 1 that is mounted on the flat cable;
branch lines that are connected to the connection device, wherein the through line and the at least one connection device are situated in the lower portion of the tunnel cross section, in particular in the lower half, the lower third, or the lower fourth of the tunnel cross section.

* * * * *